Figure 1:
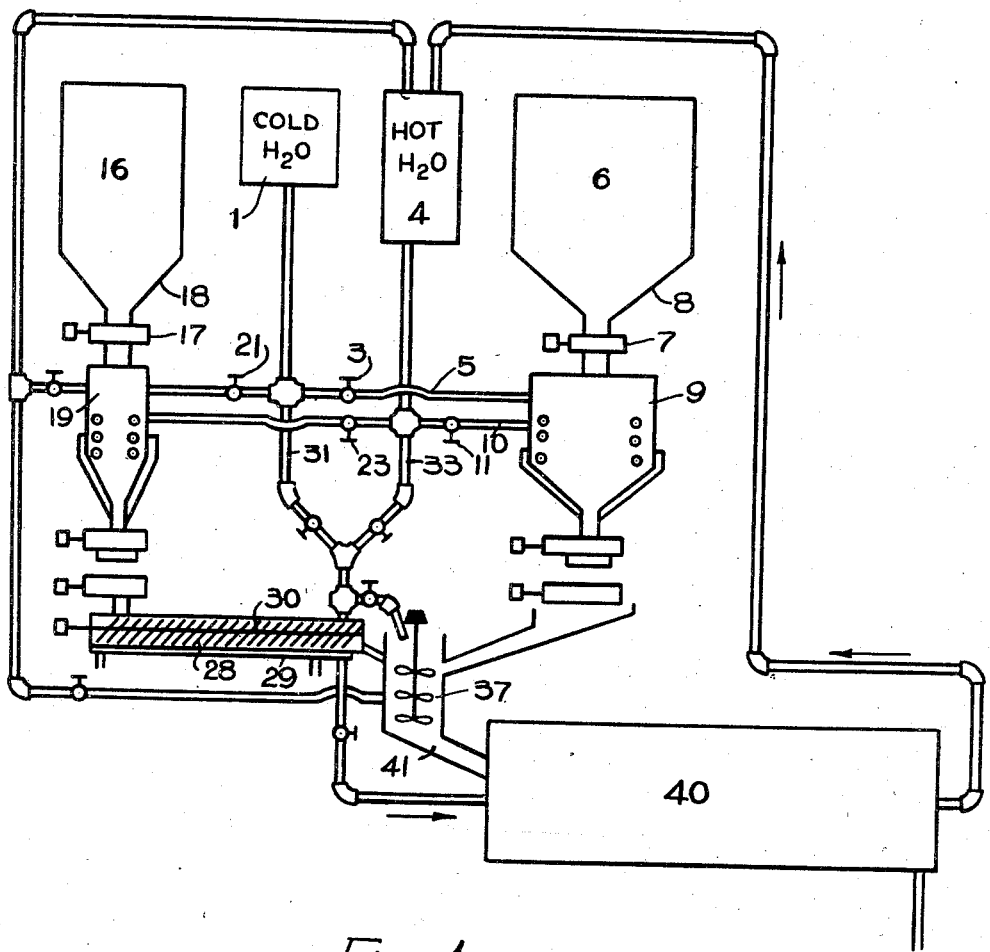

Jan. 21, 1947.  G. T. REICH  2,414,669
ART OF BREWING
Filed Oct. 6, 1941  3 Sheets-Sheet 2
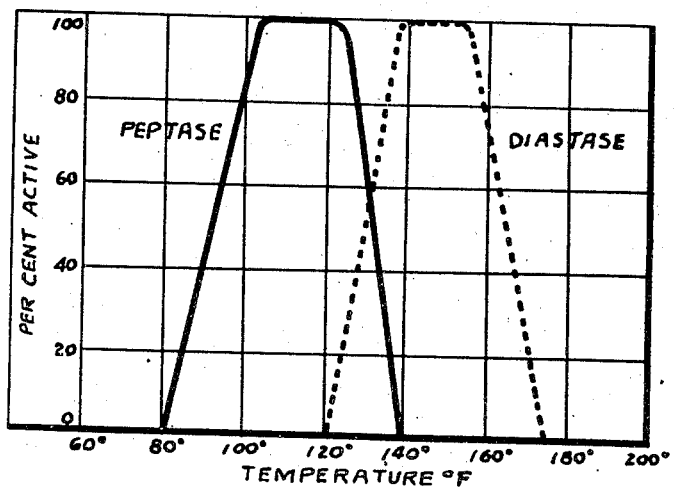
Fig. 2  ACTIVE ZONE FOR PEPTASE AND DIASTASE
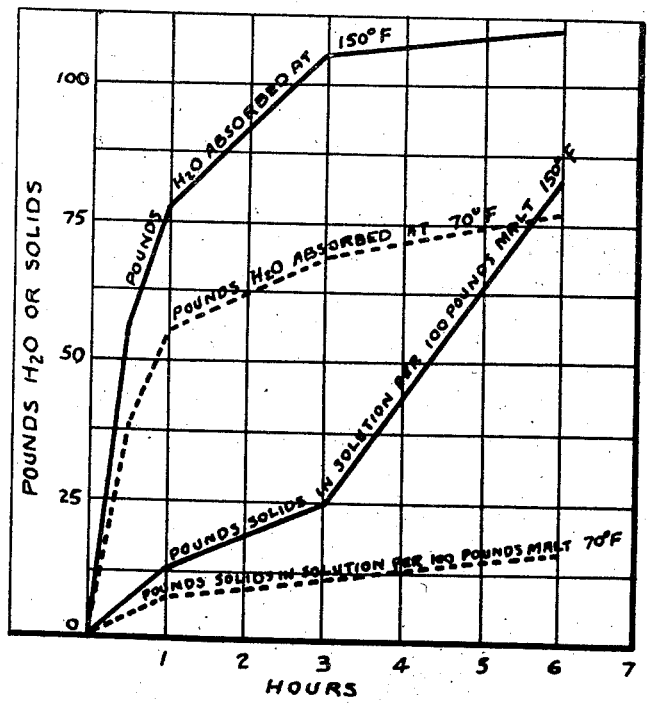
Fig. 3  SOLIDS EXTRACTED AND INCREASE IN WEIGHT PER 100 POUNDS OF MALT IMMERSED IN WATER AT VARIOUS TIMES AND TEMPERATURES
INVENTOR,
Gustave T. Reich
By Mark W. Collet  ATTORNEY.

Patented Jan. 21, 1947

2,414,669

UNITED STATES PATENT OFFICE 2,414,669

ART OF BREWING

Gustave T. Reich, Philadelphia, Pa.

Application October 6, 1941, Serial No. 413,714

8 Claims. (Cl. 99—51)

My invention relates to a continuous process of brewing beer from malt and cereal. Among its objectives are the securing of the maximum diastatic action in the minimum time thus permitting advantageous continuous saccharification, the preventing of the destruction of the diastase and peptase by heat prior to the saccharification of the mash so that the full effect of all the diastase is released in the saccharifying step, the effecting of the maximum digestion of the malt by the peptase largely prior to the saccharification, the avoiding of dissolving objectionable soluble materials found in the malt hulls by digesting the malt while the hulls are largely intact and other objects which will appear from the following specifications.

In my process the preparing of the malt and that of the cereal are separate up to the mixing immediately preceding the saccharifying stage of the mash. The malt contains proteolytic and amylic enzymes including peptase which solubilizes the albuminoids in the malt when the temperature of the malt ranges between 80° F. and 140° F. and reaches a maximum of its power between 115°–130° F. rendering them soluble and suitable for saccharifying and diastase, which saccharifies the starch in the peptonized mash. Each of these enzymes is killed by heat when the temperature of the malt rises to above 175° F. Therefore, the malt should not be heated to a temperature above 175° F. before saccharizing.

The cereal, such as rice, corn meal and the like in practice is heated to at least the boiling point of water to render its starch gelatinous and suitable for mixing with the malt and to burst the starch cells preparatory to saccharifying. By separating the boiling of the cereal from the peptonizing of the malt, and cooling the boiled cereal before mixing with the malt to such a temperature that when mixed with the malt the mixture does not attain a temperature which would kill or seriously injure the diastase, I protect the diastase from injury.

I peptonize preferably the whole malt prior to grinding and thereby I avoid contaminating the wort with the bitter soluble substances contained in the hulls. The attached curve shows the absorption of the water in the malt to be greater than the diffusion of water soluble products from the malt at various times and temperatures.

The hulls have a surface that is repellent to solution, and hence postponing their grinding until the peptonizing is either largely or completely finished, the unpleasant matter from the body of the hulls is not dissolved by water during this pre-peptonizing stage. Therefore, if the peptase acts preferably on the uncut malt the peptonizing occurs in the kernel of the malt while very little effect is produced upon the hulls, and little unpleasant substances such as resins and coloring matter are dissolved from them.

It is not necessary that all the saccharifying be postponed until the cereal is added or the peptonizing is fully accomplished. I endeavor to have the mixture of peptonized malt and gelatinized cereal at a temperature near the optimum for saccharifying the mash, and then I pass the mash evenly and smoothly through a saccharifier, in a consistent mass, kept as nearly as possible at this temperature and without agitation or disturbance of the mash.

I find the best results are obtained when I grind the mass very fine, say to 1 micron. This shortens the time of saccharifying from 50 to 75 per cent. I find shortening the time of saccharifying lessens the contaminations from the hulls. The hull particles take some time to soak and release their soluble content, and if passing through the saccharifier is rapid, the amount of these materials released to the wort is so much lessened that the grinding of the malt may be very fine. I prefer to postpone the grinding of the hulls to as late a stage of the process as possible so that the ground particles of hulls are exposed to a minimum of soaking, both during peptonizing and saccharifying, which is also controlled by the addition of water at various stages.

I pass the mash through the saccharifier with the least possible agitation. This causes the mass to pass evenly through it and the saccharifying to proceed evenly and thoroughly through the mass, and all portions of it to be saccharified equally. Finely grinding the mash to be saccharified helps this uniformity.

After the saccharifying processing, I may prepare the wort for the brew kettle by the conventional methods.

In the above, I have pointed out the features wherein my process departs from the present standard process which may be found described in the technical literature.

The description that follows describes in detail the best way of working my process that I am now aware of, but it is not to be taken as limiting my invention to less than is described above or is pointed out in my claims attached.

Figure 4:
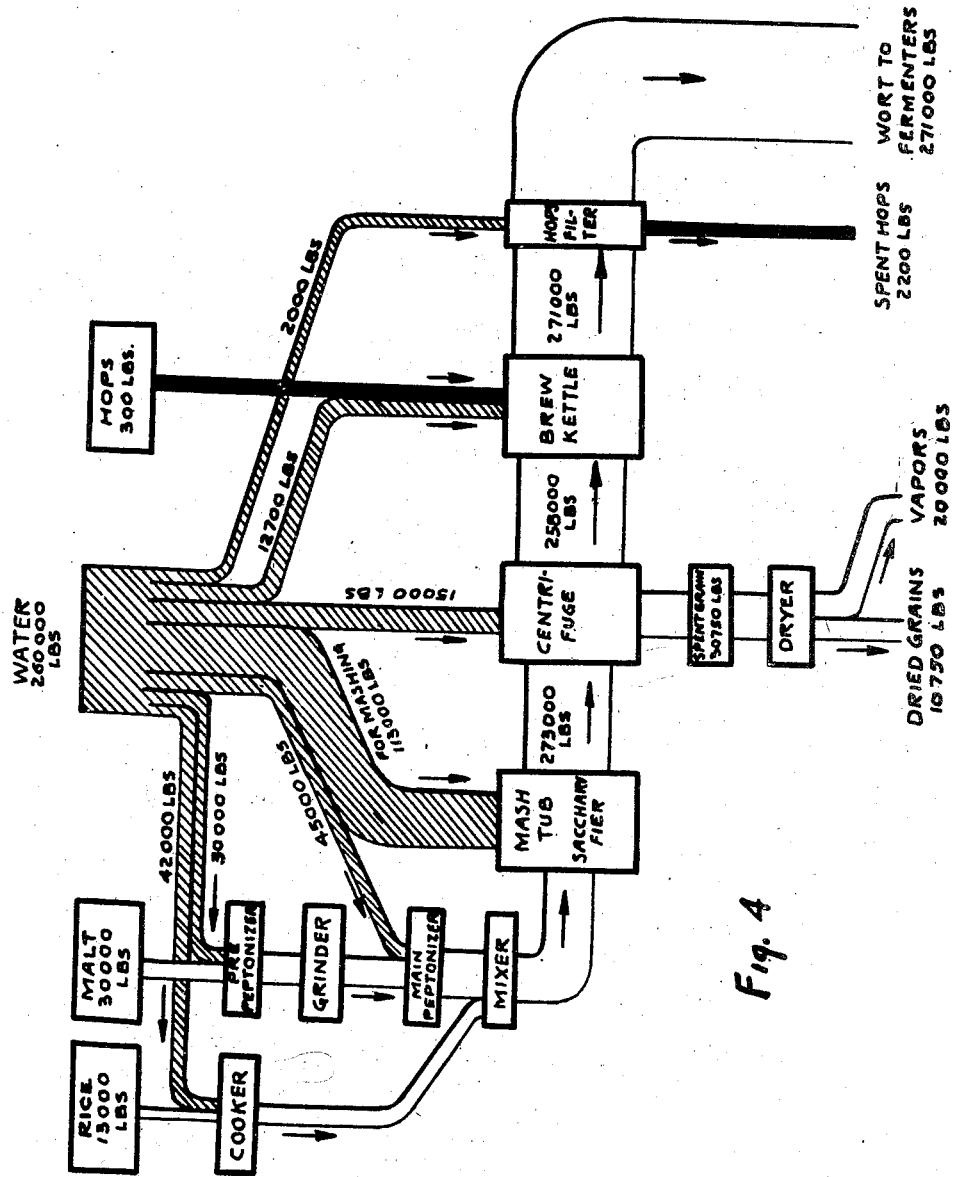

In the accompanying drawings:

Fig. 1 is a diagrammatic representation of apparatus suitable for practicing the invention; Fig. 2 is a graph illustrating the successive action of peptase and diastase; Fig. 3 is a graph illustrating the absorption of water and diffusion of solids in solution at the two temperatures of 70° F. and 150° F. and Fig. 4 is a diagrammatic flow sheet showing the flow of materials in an illustrative embodiment of the invention.

Several forms of saccharifiers and of other apparatus useful in practicing the invention are described in my co-pending application, Serial No. 328,261.

Referring particularly to Fig. 1, a cold water tank 1 and a hot water tank 4 are placed high enough to feed by gravity into the pre-peptonizing tank 19. A container 16 for malt storage, preferably having a tapered bottom 18, and a proportioner 17, are placed to feed malt also into the pre-peptonizing tank 19. The malt should be preferably whole or but slightly cut. The hot and cold water and the malt are proportioned so that a sufficient fluidity is given to the mass. The pre-peptonizing tank may be heated by a steam coil or other heating means as and if needed. The temperature in the pre-peptonizing tank should be at the temperature of 120° F. as nearly as possible, as this is the temperature of maximum efficiency of the peptase (see Fig. 2). It is kept at that temperature until the peptase has converted the albuminoids into soluble materials. Normally this will require about one to two or three hours at 120° F. The temperature may be regulated by controlling the relative quantity of hot water and cold water by means of valves 21 and 23. The total quantity of water is sufficient to give a soft slurry form to the mass, being pre-peptonized after grinding.

The cereal, for example rice or corn meal, is stored in storage tank 6 that is provided with a proportioner 7 and has a tapered bottom 8. A cooker 9 for the cereal is fed from the hot water tank 4 by a pipe 10 having a valve 11, and from the cold water tank 1 by pipe 5 having a valve 3. The cereal may be in any suitable form. If rice, for instance, it may be whole or broken. The proportioner 17 and the valves 21 and 23 are set to give the required quantity of water and cereal. I heat the mixture of cereal and water to a boiling temperature or higher, so as to gelatinize the starch in the cereal and burst the starch cells. I prefer omitting the addition of any malt in the cereal, contrary to the general practice in the brewing industry, because the enzymes in the malt introduced into the boiling cereal would be killed, and the added malt would become of no value in the saccharifying stage. It would be just that much more cereal. The boiling of the cereal should be continued until it is gelatinized, and the starch cells thoroughly disrupted.

I preferably grind the pre-peptonized malt and, if necessary, the cooked cereal, separately. I prefer a ground material having a fineness of approximately 1 micron. Either before or after the grinding of the cereal, the cooked cereal is cooled directly or indirectly with water to such a temperature that it will not destroy and impair the effectiveness of the enzymic action of the malt when mixed with it. I prefer that this temperature be below 160° F.

The cooking of the cereal and the pre-peptonizing of the malt is preferably continuous.

The peptonizing tank 28 provided with a heating jacket 29 and agitator 30 should allow the practically complete peptonization of the finely ground pre-peptonized malt, which is preferably mixed with an additional amount of water thereby increasing the fluidity of the ground malt.

The boiling kettle for the cereal should allow the cereal being boiled and moved continuously through it as illustrated diagrammatically in Fig. 1. The preferred type of kettle is a cylinder in which the mass to be processed is moved steadily and evenly forward by propellers placed inside the cylinders. The order in which the cereal is treated is variable. It may be pre-heated or may be soaked before boiling, may be ground before boiling, or any of these treatments carried on before boiling. The ultimate product of the cereal is the production of a cooked cereal in a generally glutinous condition with the starch cells burst open.

After the cereal has been cooked sufficiently, it is cooled to a temperature that when the next stage of the process, viz., the mixing of the cooked cereal and the peptonized malt occurs, the enzymes in the malt will not be killed or injured by the hot cereal. At this mixing the malt preferably has been peptonized and the diastatic action has begun in it. Referring to the graph, Fig. 2 this temperature is seen to be 140° F. or somewhat less. The optimum cereal temperature for mixing is about this temperature. When the cereal has reached the condition where it is gelatinized and the starch cells disrupted, and the malt has been peptonized, the cereal is mixed with the malt, an additional amount of water preferably being added to the mixture so as to facilitate the saccharification of the starch. The cereal and the malt are mixed in pre-determined quantities according to the kind of beer desired. In this mixer the temperature is raised to about 145–155° F. by regulating the relative quantities of hot and cold water added.

Referring to Fig. 3, it is seen that the weight of malt increases by the addition of water very rapidly, especially in the first hour, while at lower temperature the curve of this increase of weight of water absorbed, flattens out after the first hour. The amount of solids in solution on the contrary increases slowly at first, but after three hours, the curve shoots sharply upward. Therefore, the most advantageous conditions for the peptonization are produced by a short rapid raising of the temperature.

A mixer 37 is provided with two water feeds 33 and 31 for hot and cold water respectively and preferably these are united to feed water mixed to the desired temperature.

As an example of relative quantities of cereal and of malt and of water, per 1000 barrels of beer, I may mix 30,000 lbs. of malt with 30,000 lbs. of water in the pre-peptonizing stage of the malt processing as shown in Fig. 4. If I use rice as the cereal, I use 13,000 lbs. of rice and 42,000 lbs. of water (steam and water) in the cooking. I mix the peptonized malt and water and the separately cooked rice and water, producing a mixture weighing 115,000 lbs. To this mixture, I add about 158,000 lbs. of water which is heated to a temperature that will raise the temperature of the mixed mass quickly, and preferably suddenly, to the saccharifying temperature of 145 to 155° F. I prefer to do this in the mixer. I may decrease the amount of water added to the mixer and increase the amount of water used for the peptonization of the malt and cooking of the cereal. Referring to the graphs, it is seen this will secure the production of the greatest quantity of wort, contaminated with the least quantity of solids, extracted from the hulls.

I prefer this mixing of the malt and cereal and the addition of the water to the mixture as explained above to be done in the mixer, with agitation of the mash thus formed to secure the thorough mixing, so that with this thorough mixing and the fine grinding of the solid ingredients of the mash to approximately 1 micron, the mash is ready for an even and uniform flow through the saccharifier, where the saccharifying of the mash principally occurs. This mixing and the raising of the mash to the saccharifying temperature should proceed as rapidly as conveniently possible.

The conveyor 41 leads the mash from the mixer to the saccharifier 40. The essential features of the saccharifier are that the mash will be moved not too fast, and uniformly and evenly through it, without disturbing, so far as possible, the relative position, and that it will be kept throughout its passage through the saccharifier at a temperature of practically 145° to 155° F., or at a higher temperature, depending upon the quality of wort required, namely, a variable ratio between sugars and non-sugars and that each particle in the mash will be in the saccharifier practically the same length of time. The fineness of the grinding of the cereal and of the malt and predetermined amount of water will prevent substantially any deposit of these materials in a saccharifier. If any deposit occurs it will be of larger particles. No agitation is needed to keep the finely ground particles of the mash in suspension.

The wort from the saccharifier is treated in any of the well known manners, and I do not limit my process to any of the various mechanisms or processes in practical use. Sparging and other processings are well known, as are the mechanisms commonly used in them. I do not confine myself to any particular processing or apparatus.

The various processings which I have described form a consecutive process, but my invention includes the uses of all of them. Many of them are individually novel and combinations of these various processings are also novel as combinations, and my invention is not to be limited to less than is claimed by the accompanying claims.

I claim:

1. A method of mashing comprising heating unground malt in the presence of water at a temperature of from 115° to 130° F., thereafter completing the peptonizing of the malt at a higher temperature not exceeding about 140° F., adding the peptonized malt to finely ground cooked cereal at an elevated temperature not exceeding about 160° F., and maintaining the mixture at saccharifying temperature until saccharification is complete.

2. A method of mashing comprising heating unground malt in the presence of water at a temperature of from 115° to 130° F., thereafter grinding the malt and completing the peptonizing of the malt at a higher temperature not exceeding about 140° F., adding the peptonized malt to finely ground cooked cereal at an elevated temperature not exceeding about 160° F., and maintaining the mixture at saccharifying temperature until saccharification is complete.

3. A method of mashing comprising heating unground malt in the presence of water at about 120° F., thereafter grinding the malt and completing the peptonizing of the malt at a higher temperature not exceeding about 140° F., adding the peptonized malt to finely ground cooked cereal at an elevated temperature not exceeding about 160° F., and maintaining the mixture at saccharifying temperature until saccharification is complete.

4. A method of mashing comprising heating unground malt in the presence of water for about one to three hours at a temperature of from 115° to 130° F., thereafter completing the peptonizing of the malt at a higher temperature not exceeding about 140° F., adding the peptonized malt to finely ground cooked cereal at an elevated temperature not exceeding about 160° F., and maintaining the mixture at saccharifying temperature until saccharification is complete.

5. A method of mashing comprising heating unground malt in the presence of water at about 120° F., thereafter grinding the malt and completing the peptonizing of the malt at a higher temperature not exceeding about 140° F., adding the peptonized malt to finely ground cooked cereal at an elevated temperature not exceeding about 160° F., and maintaining the mixture at about 145° to 155° F. until saccharification is complete.

6. A method of mashing comprising heating unground malt in the presence of water insufficient in amount for complete peptonization of the malt at a temperature of from 115° to 130° F., thereafter grinding the malt, adding a further amount of water, and completing the peptonizing of the malt at a higher temperature not exceeding about 140° F., adding the peptonized malt to finely ground cooked cereal at an elevated temperature not exceeding about 160° F., and maintaining the mixture at saccharifying temperature until saccharification is complete.

7. A method of continuous mashing which comprises passing unground malt and water through a zone heated to about 120° F., grinding the malt, passing the ground malt through a zone heated to a higher temperature not exceeding about 140° F. to complete peptonization, mixing the peptonized malt with finely ground cooked cereal and passing the mixture through a zone heated to about 145° to 155° F. until saccharification is complete.

8. A method of mashing comprising separately peptonizing malt at a temperature of from 80° to 140° F. and gelatinizing grain by cooking, mixing the gelatinized grain and the peptonized malt at a temperature not exceeding 160° F., and saccharifying the mixture at 145° to 155° F.

GUSTAVE T. REICH.